United States Patent [19]

Kohlhammer et al.

[11] Patent Number: 5,278,225

[45] Date of Patent: Jan. 11, 1994

[54] AQUEOUS DISPERSIONS, CONTAINING AMINOOXY CROSSLINKING AGENTS, OF COPOLYMERS CONTAINING CARBONYL GROUPS

[75] Inventors: Klaus Kohlhammer, Marktl; Wilfried Huster, Emmerting; Wolfgang Deinhammer, Burghausen, all of Fed. Rep. of Germany

[73] Assignee: Wacker-Chemie GmbH, Munich, Fed. Rep. of Germany

[21] Appl. No.: 865,080

[22] Filed: Apr. 8, 1992

[30] Foreign Application Priority Data

May 28, 1991 [DE] Fed. Rep. of Germany ....... 4117487

[51] Int. Cl.$^5$ .................................................. C08K 5/24
[52] U.S. Cl. .................................... 524/560; 524/558; 524/555; 524/262; 524/265; 524/188
[58] Field of Search ............... 524/555, 558, 560, 262, 524/265, 188; 525/376

[56] References Cited

U.S. PATENT DOCUMENTS 4,666,962  5/1987  Ravichandran ..................... 524/101

FOREIGN PATENT DOCUMENTS 3537099  4/1987  Fed. Rep. of Germany .

Primary Examiner—Joseph L. Schofer
Assistant Examiner—Jeffrey T. Smith
Attorney, Agent, or Firm—Burgess, Ryan & Wayne

[57] ABSTRACT

The invention relates to aqueous dispersions containing aminooxy crosslinking agents, of copolymers containing carbonyl groups, to processes for the preparation thereof and to the use thereof as a crosslinking system in binders, adhesives and coating agents.

14 Claims, No Drawings

AQUEOUS DISPERSIONS, CONTAINING AMINOOXY CROSSLINKING AGENTS, OF COPOLYMERS CONTAINING CARBONYL GROUPS

BACKGROUND OF THE INVENTION

1) Field of the Invention

The invention relates to aqueous dispersions, containing aminooxy crosslinking agents, of copolymers containing carbonyl groups, to processes for the preparation thereof and to the use thereof as a crosslinking system in binders, adhesives and coating agents.

2) Description of the Related Art

Aqueous dispersions based on copolymers which contain carbonyl groups and contain polyhydrazides or polyhydrazones, lead to the formation of highly crosslinked films during the film formation as a result of the chemical reaction between the carbonyl groups of the cohydrazides or polyhydrazones. Such crosslinking systems have been disclosed, for example, by DE-A 1,495,706 (U.S. Pat. No. 3,345,336) or EP-A 15,644 (U.S. Pat. No. 4,256,809).

Due to the good adhesion properties, such copolymer dispersions which crosslink on film formation are used as binders (DE-A 3,319,239=EP-A 130,336), adhesives (EP-B 148,386 =U.S. Pat. No. 4,609,420, DE-A 3,319,240=U.S. Pat. No. 4,529,772), sealing compounds (DE-A 3,537,099) and coating agents (DE-A 3,724,369 U.S. Pat. No. 4,8941261). A disadvantage is, however, the unsatisfactory strength of the adhesive bonds on storage in water.

A further disadvantage of these crosslinking systems is the release of highly toxic and carcinogenic hydrazines during the storage and use of such systems. In EP-B 3,516 (U.S. Pat. No. 4,250,070), DE-A 2,819,092 (U.S. Pat. No. 4,267,091) and DE-A 3,216,967, it is therefore proposed to add water-soluble transition metal salts to the polyhydrazine-containing copolymer dispersions, in order to reduce the content of free hydrazine.

DE-A 3,241,829 (U.S. Pat. No. 4,546,078) has disclosed a process for the immobilization of microorganisms, the microorganisms being suspended in an aqueous solution of an acrolein/vinylpyrrolidone copolymer. After the addition of an aqueous solution of an alkylenedioxydiamine compound, the microorganisms are enclosed in the immediately forming, gel-like polymer mass.

It is an object of the present invention to provide aqueous dispersions which are based on dispersions, containing carbonyl groups, with crosslinking agents and which crosslink on film formation, but with which no release of hydrazine or at least a lower release of hydrazine than in the case of the polyhydrazine crosslinking agents mentioned in the state of the art. Moreover, the crosslinking should proceed only at temperatures of $\geq$ about 10° C., preferably $\geq$ room temperature. Additionally, the systems should also have a high storage stability coupled with a high degree of crosslinking during the film formation. The adhesive bonds produced with the dispersions should be resistant to water or organic solvents.

SUMMARY OF THE INVENTION

The invention relates to aqueous dispersions, containing aminooxy crosslinking agents, of copolymers containing carbonyl groups, comprising A) from about 30 to 70% by weight, relative to the total weight of the dispersion, of a copolymer composed of from about 70 to about 99.9 by weight of one or more comonomers from the group comprising (meth)acrylates of alcohols having 1 to 10 carbon atoms, vinyl esters of saturated aliphatic carboxylic acids having 2 to 10 carbon atoms, olefins, vinylaromatics, vinyl halides and/or vinyl ethers and about 0.1 to about 30% by weight of one or more ethylenically unsaturated comonomers, containing carbonyl groups, from the group comprising ethylenically $\alpha,\beta$-unsaturated aldehydes, alkyl vinyl ketones, vinyl ketocarboxylates, N-keto-acrylamides, diketene, carbon monoxide and acetoacetoxyethyl (meth)acrylate, and B) from about 0.1 to 10 mol, per mol of carbonyl groups in the copolymer of paragraph A, of an aminooxy crosslinking agent of the general formula

$$(H_2NO)_mR(CONHNH_2)_n$$

where R is a substituted or unsubstituted aliphatic or aromatic hydrocarbon radical or an organosiloxane radical, $m \geq 1$, $n = 0$ or 1, and $m + n \leq 3$, or a salt thereof with an anion of an organic or inorganic acid.

DESCRIPTION OF THE PREFERRED EMBODIMENT

The copolymers containing carbonyl groups, according to the invention, which can also be graft copolymers, are prepared in the known manner by free radical polymerization in bulk, in solution, in suspension or in emulsion. Emulsion polymerization is the preferred variant of the processes. The preferred base monomers are methyl methacrylate, methyl acrylate, ethyl methacrylate, ethyl acrylate, isopropyl methacrylate, isopropyl acrylate, tert.-butyl acrylate, n-butyl acrylate and ethylhexyl acrylate from the group comprising the methacrylates or acrylates of alcohols having 1 to 10 carbon atoms, vinyl acetate, isopropenyl acetate, vinyl propionate, vinyl laurate and vinyl versatatese ® having 9 to 10 carbon atoms (vinyl esters of saturated $\alpha$-branched monocarboxylic acids, commercial products made by Shell) from the group comprising the vinyl esters of saturated aliphatic carboxylic acids having 2 to 10 carbon atoms, ethylene, propylene and 1,3-butadiene from the group comprising the olefins, vinyl chloride from the group comprising the vinyl halides, and styrene as the preferred vinyl aromatic.

If desired, the copolymers according to the invention can also contain, as base monomers, up to about 10% by weight, relative to the copolymer, of ethylenically unsaturated functional comonomers. Examples of these are mono- or di-carboxylic acids such as methacrylic acid, acrylic acid or fumaric acid, and amides thereof, hydroxy-functional monomers such as hydroxyethyl acrylate, 2-hydroxypropyl acrylate or N-methylolacrylamide, and also sulfonate-functional monomers such as vinylsulfonate or methacrylamidopropanesulfonic acid.

The content of ethylenically unsaturated comonomers containing carbonyl groups is preferably about 0.1 to about 20% by weight, especially from about 0.5 to about 5.0% by weight, each relative to the copolymer.

Preferred examples of these are acrolein, methacrolein, crotonaldehyde and formylstykene from the group comprising the ethylenically α,β-unsaturated aldehydes, vinyl methyl ketone or vinyl ethyl ketone from the group comprising the alkyl vinyl ketones, vinyl levulinate from the group comprising the vinyl ketocarboxylates, and diacetone-acrylamide from the group comprising the N-ketoacrylamides. Diacetone-acrylamide, crotonaldehyde, methacrolein, acetoacetoxyethyl acrylate and acetoacetoxyethyl methacrylate are particularly preferred.

Particularly preferred copolymers in Paragraph A above, having a content of the said ethylenically unsaturated comonomers containing carbonyl groups are: copolymers based on ethylene/vinyl chloride copolymers having an ethylene content of preferably 10 to 50% by weight and a vinyl chloride content of 50 to 90% by weight, each relative to the total weight of the copolymer A;- copolymers based on ethylene/vinyl acetate copolymers, having an ethylene content of preferably from about 10 to about 50% by weight and a vinyl ester content of from about 50 to about 90% by weight, each relative to the total weight of the copolymer A; copolymers having an ethylene content of from about 10 to about 50% by weight, a vinyl ester content of about 50 to about 90% by weight and a (meth) acrylate content of about 5 to about 20% by weight, especially copolymers with butyl acrylate, methyl methacrylate and/or ethylhexyl acrylate.

Copolymers based on the ethylene/vinyl chloride, ethylene/vinyl acetate and ethylene/vinyl acetate/(meth)acrylate polymers having a content of up to about 10% by weight of N-methylolacrylamide, acrylic acid, vinylsulfonate and/or 2-hydroxypropyl acrylate.

Copolymers based on (meth)acrylate copolymers with methyl methacrylate, butyl acrylate and/or ethylhexyl acrylate.

The % by weight data here always add up to 100% by weight in the copolymer.

The preparation of the aqueous copolymer dispersions is preferably effected by the emulsion polymerization process and is carried out in the conventional polymerization vessels. The polymerization can be carried out discontinuously or continuously, with or without the individual constituents of the reaction mixture, or with -partial initial introduction and further addition of the constituents or individual constituents of the reaction mixture, or by the controlled -feed process without initial introduction and further addition of the constituents or individual constituents of the reaction mixture, or by the controlled feed proceeds without initial introduction. All feed additions are preferably carried out in line with the consumption of the particular components.

The emulsion polymerization is carried out in a temperature range from 0 to about 100° C. and initiated by the methods conventionally used for the emulsion polymerization.

The initiation is effected by means of the conventional water-soluble free-radical formers which are preferably used in quantities of from about 0.01 to about 3.0% by weight, relative to the total weight of the monomers. Examples of these are ammonium and potassium persulfate and peroxodisulfate; hydrogen peroxide; alkyl hydroperoxides such as tert.-butyl hydroperoxide; potassium, sodium and ammonium peroxodiphosphate; azo compounds such as azobisisobutyronitrile or azobiscyanovaleric acid. If desired, the said free-radical initiators can also be combined in the known matter with 0.01 to 0.5% by weight, relative to the total weight of the monomers, of reducing agents. Suitable examples are alkali metal formaldehydesulfoxylates. In the case of redox initiation, one or both redox catalyst components are then preferably added under control during the polymerization.

The dispersants used can be all the emulsifiers and protective colloids conventionally used in emulsion polymerization. Preferably, from about 1 to about 6% by weight, relative to the total weight of the monomers, of emulsifier are used. Suitable examples are anionic surfactants, such as alkylsulfates having a chain length from 8 to 18 carbon atoms, alkyl and alkylaryl ether-sulfates having 8 to 18 carbon atoms in the hydrophobic radical and up to about 40 units of ethylene oxide or propylene oxide; alkyl-or alkylaryl-sulfonates having 8 to 18 carbon atoms, esters and half-esters of sulfosuccinic acid with monohydric alcohols or alkyl phenols. Examples of suitable nonionic surfactants are alkyl polyglycol ethers or alkylaryl polyglycol ethers with from about 8 to about 40 units of ethylene oxide.

If appropriate, protective colloids can be used, preferably in quantities of up to about 15% by weight, relative to the total weight of the monomers. Examples of these are vinyl alcohol/vinyl acetate copolymers having a content of from about 80% to about 100 mol % of vinyl alcohol units, polyvinylpyrrolidones having a molecular weight from about 5,000 to about 400,000 and hydroxyethylcelluloses having a range of the degree of substitution from 1.5 to 3.

The pH range desired for the polymerization, which is in general between about 2.5 and about 10, preferably 3 and 8, can be adjusted in the known manner by acids, bases or conventional buffer salts such as alkali metal phosphates or alkali metal carbonates. For adjusting the molecular weight, the regulators conventionally used, for example mercaptans, aldehydes and chlorinated hydrocarbons, can be added in the polymerization.

For the crosslinking of the copolymers containing carbonyl groups, the aqueous dispersions according to the invention also contain from about 0.1 to about 10 mol, preferably from about 0.3 to about 4 mol, per mol of carbonyl groups, in the copolymer A, of an aminooxy crosslinking agent of the general formula $$(H_2NO)_mR(CONHNH_2)_n$$

where R is a substituted or unsubstituted aliphatic or aromatic hydrocarbon radical or an organosiloxane radical, $m \geq 1$, $n = 0$ or $1$, and $m + n \leq 3$, or a salt thereof with an anion of an organic or inorganic acid.

The preferred crosslinkinq agents are bifunctional compounds of the formula $(H_2NO)R(CONHNH_2)$, crosslinking agents having two aminooxy groups of the formula $(H_2NO)_2R$ are most preferred.

Examples of suitable spacers R are saturated branched or unbranched alkylene radicals having 1 to 10 carbon atoms such as, say, an ethylene, propylene, isopropylene, butylene, pentylene or hexylene radical. Unsaturated acyclic radicals R having up to 4 carbon atoms, for example the butenylene radical, are also suitable. Examples of aromatic radicals R are meta-xylene and para-xylene. Suitable organosiloxane radicals are diorganopolysiloxanes, for example dimethylpolysiloxanes $(CH_3)_3Si(Si(CH_3)_2O)_xSi(CH_3)_3$ end-blocked with trimethyl-siloxy groups and having a degree of polymerization x from 1 to 5.

Examples of salts for the above-mentioned cross-linking agents are, for salts of inorganic acids, the corresponding hydrochlorides, hydrobromides, carbonates, sulfates or perchlorates.

Examples of salts of organic acids are the corresponding acetates, propionates or benzoates. The hydrochloride or hydrobromide salts of the crosslinking agents are preferred, and the monohydrochlorides or monohydrobromides are particularly preferred.

Preferred crosslinking agents are the following compounds and the salts thereof: diaminooxyethane, 1,2-diaminooxy-propane, 1,3-diaminooxy-propane, 1,2-diaminooxy-butane, 1,3-diaminooxy-butane, 1,4-diaminooxy-butane, 2,3-diaminooxy-butane, 1,2-diaminooxy-isobutane, 1,3-diaminooxy-isobutane, disubstituted aminooxy-pentanes and aminooxy-isopentanes such as 1,5-diaminooxy-pentane, disubstituted aminooxy-hexanes and aminooxy-isohexanes such as 1,6-diaminooxy-hexane, 1,4-diaminooxy-butene, aminooxy-acetohydrazide, 2-aminooxy-propionohydrazide, 3-aminooxy-propionohydrazide, 2-methyl-2-aminooxy-propionohydrazide, 2-aminooxy-butyrohydrazide, 4-aminooxy-butyrohydrazide, 2-aminooxy-valerohydrazide, 5-aminooxy-valerohydrazide, 2-aminooxy-enanthohydrazide, 2-aminooxy-caprylohydrazide, 2-aminooxy-caprinohydrazide, 2-aminooxy-laurohydrazide, 2-aminooxy-myristohydrazide, 2-aminooxy-palmitohydrazide and 2-aminooxy-stearohydrazide.

Particularly preferred crosslinking agents are the following compounds and the salts thereof: 1,3-diaminooxy-propane, 1,4-diaminooxy-butane, aminooxy-acetohydrazide, 2-aminooxy-propionohydrazide and 2-methyl-2-aminooxy-propionohydrazide. 1,3-Diaminooxy-propane, 1,4-diaminooxy-butane and salts thereof are especially preferred.

It is possible to prepare the crosslinking agents by methods known from the literature. Thus, the preparation of mono- or multi-aminooxy-substituted crosslinking agents can be effected by reacting ethyl urethane with the correspondingly mono- or multi-halogen-substituted aliphatics, alkylaromatics or siloxanes (A. Fuller, J. Chem. Soc. 1947, 963). Aminooxy-carboxylic acid hydrazide compounds with mixed substitution are accessible, for example, by reacting the aminooxy-carboxylic acid esters preparable according to Fuller with hydrazine hydrate.

The dispersions according to the invention can be prepared by mixing the aqueous dispersions of the copolymers containing carbonyl groups with the aminooxy-functional crosslinking agents. Preferably, the aminooxy-functional crosslinking agents are first introduced in an aqueous solution or added to the copolymer dispersion. With particular preference, the salts of the aminooxy-functional crosslinking agents are first introduced in aqueous solution and the copolymer dispersion is added. The concentration of the aminooxy-functional crosslinking agents in the aqueous solution is preferably about 20 to 80% by weight.

The dispersions according to the invention can be used as binders for producing coverings, coatings and impregnations in the coating field. Examples of these are the use as a coating agent for flexible substrates such as leather, the use as a binder in paper-sizing compounds, the use as binders in curing varnishes and paint materials. The claimed dispersions are also suitable as binders in sealing compounds. A further field of application is the use as adhesives; for example for the production of nonwoven materials and as an adhesion promoter between the adhesive layer and the substrate in high-gloss film laminating. The aqueous dispersions according to the invention are particularly suitable as adhesives for bonding to corona- and flame-pretreated polyolefin surfaces.

When compared with the aqueous dispersions known from the state of the art based on crosslinkable copolymers containing carbonyl groups, the dispersions according to the invention are distinguished in that only a slight release of hydrazine or none at all takes place. The adhesive bonds produced with the dispersions according to the invention show high peel strengths and very good wet strength. Even after a storage time of more than 5 months, no viscosity changes are detectable, i.e., the dispersions are storage-stable for many months.

The examples which follow serve to explain the invention in more detail:

I Preparation of the Aqueous Copolymer Dispersions Containing Carbonyl Groups

EXAMPLE 1

1070 g of an aqueous dispersion containing 52% by weight of an ethylene/vinyl acetate copolymer (ethylene content: 25% by weight) and 3.5 g of Fe-ammonium sulfate solution were first introduced into a glass flask fitted with three metering vessels. One metering vessel contained 2.88 g of potassium persulfate dissolved in 87 ml of water as an initiator dosage. In the second metering vessel, 1.65 g of sodium hydroxymethanesulfinate were dissolved in 87 ml of water as an initiator dosage. In the third metering vessel fitted with a stirrer, 56 ml of water, 4.31 g of Genapol X360 (isotridecyl polyglycol ether from Hoechst AG) as a 25% aqueous solution, 1.85 g of Aerosol A102 (sulfosuccinic acid half-ester from Cyanamid GmbH) as a 30% aqueous solution, 111 g of t-butyl acrylate and 27.8 g of diacetone-acrylamide were emulsified.

The material initially introduced was heated up to 450° C. with stirring. After the temperature had been reached, the initiator solutions were added at a metering rate of 20 g/hour each. Immediately after the start of metering of the initiator solutions, the preemulsion was metered in over a period of 4 hours. After the end of the metering, the emulsion was cooled to room temperature and screened through a 160 μm mesh. The resulting dispersion had a solids content of 45% by weight. The copolymer had the following composition: 20% by weight of ethylene, 60% by weight of vinyl acetate, 10% by weight of t-butyl acrylate and 4% by weight of diacetone-acrylamide.

EXAMPLE 2

The following were first introduced into a 15 l pressure autoclave: 3.8 l of deionized water 19.4 g of vinylsulfonate in a 25% aqueous solution, 3.2 g of Fe-ammonium sulfate in a 10% aqueous solution, 84 g of Aerosol A102 in a 30% aqueous solution, 83.5 g of Genapol PF40 (propylene oxide/ethylene oxide copolymer from Hoechst AG) in a 20% aqueous solution, 49.0 g of n-butyl acrylate and 429 g of vinyl acetate. As the initiator dosages, 116 g of ammonium persulfate were dissolved in 1.3 l of water in one metering vessel, and 58.2 g of sodium hydroxymethanesulfinate were dissolved in 1.2 l of water in a further metering vessel. As a monomer dosage, 4.84 kg of vinyl acetate were held ready in a metering vessel, and a mixture of 0.62 kg of vinyl acetate and 0.18 kg of diacetone-acrylamide in a further metering vessel. Finally, a preemulsion consisting of 355 g of water, 638 g of N-methylolacrylamide in a 48% aqueous solution, 55.7 g of acrylic acid and 790 g of Genapol X360 in a 25% aqueous solution wad prepared in a metering vessel.

The material initially introduced was heated up to 450° C. with continuous stirring and, after the temperature had been reached, charged with ethylene- under a pressure of 58 bar. The initiator solutions were metered in at rates of 93 g/hour (ammonium persulfate) and 82 g/hour respectively, until the start of the reaction was detectable by an exothermic evolution of heat. From this point in time, the metering rates were changed to 79 g/hour and 70 g/hour. Half an hour after the start of the reaction, the metering of the vinyl acetate (metering time 5 hours) and of the preemulsion (metering time 6 hours) were started. After the end of the vinyl acetate metering, the monomer mixture was metered in within one hour. Whereas no further ethylene was injected 10 minutes before the end of the metering of the pre-emulsion, the initiator meterings were not turned off until half an hour after the end of the metering of the pre-emulsion or monomer mixture. After the end of the polymerization, the dispersion was adjusted with $NH_3$ to pH=6, and the pressure was then released. After the pressure release, the dispersion was adjusted to pH=4.5. The resulting dispersion had a solids content of 52% by weight. The copolymer had the following composition: 20% by weight of ethylene, 72% by weight of vinyl acetate, 0.7% by weight of n-butyl acrylate, 0.05% by weight of vinylsulfonate, 4.1% by weight of N-methylolacrylamide, 0.75% by weight of acrylic acid and 2.4% by weight of diacetone-acrylamide.

II Preparation of the Aminooxy-Substituted Crosslinking Agents

EXAMPLE 3

1,3-Diaminooxy-propane monohydrochloride

The preparation was carried out analogously to the method indicated by Fuller, J. Chem. Soc. 1947, 963.

EXAMPLE 4

1,4-Diaminooxy-butane monohydrochloride,

Preparation analogously to Example 3.

EXAMPLE 5

60 g of ethyl aminooxy-acetate, 32 g of 80% aqueous hydrazine hydrate and 300 ml of ethanol were heated for 7 hours under reflux. After the volatile constituents had been stripped off at 11 mbar and 50° C. bath temperature in & rotary evaporator, 51 g of slightly yellowish solid with 92% of aminooxy-acetohydrazide remained.

EXAMPLE 6

8.4 g of ethyl 2-aminooxy-isobutyrate were heated with 3.6 g of 80% hydrazine hydrate and 20 ml of ethanol. for 15 hours under reflux. The volatile constituents were then stripped off in a rotary evaporator. 6.9 g of a yellowish oil having a content of 78% of 2-aminooxyisobutyrohyrazide remained.

III Mixing of the Crosslinking Agent-Containing Dispersions According to the Invention

EXAMPLE 7

0.5 g of 1,3-diaminooxypropane monohydrochloride (Example 3) were dissolved in 0.3 g of water. 40 g of the dispersion according to Example 1 were added with stirring. The solids content was 45%.

EXAMPLE 8

1.64 g of a 32% aqueous solution of 1,4-diaminooxybutane monohydrochloride (Example 4) were first introduced. 40 g of the dispersion according to Example 1 were added with stirring. The solids content was 45%.

EXAMPLE 9

1.13 g of a 50% aqueous solution of 2-aminooxyisobutyrohyrazide (Example 5) were first introduced, and 40 g of the dispersion according t o Example 1 were added with stirring. The solids content was 45% by weight.

Comparison Examples

COMPARISON EXAMPLE 1

3.69 g of adipic acid dihydrazide were dissolved in 3.62 g of water. 200 g of the dispersion from Example 1 were added with stirring. The solids content was 45% by weight.

COMPARISON EXAMPLE 2

As a blank, the dispersion from Example 1 was used without further addition of crosslinking agent. The solids content was 45% by weight.

IV Application Testing of the Dispersions According to the Invention as Binders in Laminating Adhesives A 50 μm thick polyethylene film made by 4P-Folie, Forchheim, was treated with a corona discharge by means of a discharge rod made by Softal Electronic (Type: HR-1R AB 300). The dispersions containing crosslinking agent according to the Examples and the dispersions of the Comparison Examples were applied to the pretreated film side in a wet layer thickness of 12 μm, corresponding to 5.7 g/m² dry. The film was then dried for 5 minutes at 70° C. and covered by a second pretreated polyethylene film of the specification. To make a bond, the above-mentioned films were sealed for 3 seconds at 80° C. and 3 bar. After storage of the bonds in accordance with the storage cycles described below, the bonding strength was determined by means of a determination of the peel strength.

V Storage Cycles

Storage Under Standard Atmospheric Conditions

The bonds were stored for 5 minutes, 15 minutes, 30 minutes, 1 hour, 5 hours and 48 hours under standard atmospheric conditions (23° C., 50% relative atmospheric humidity).

VI Water Storage

The bonds were stored for 5 hours under standard atmospheric conditions, subsequently for 30 minutes in boiling water and then for 1 hour in cold water (23° C.) (=boiling test 5 hours at room temperature).

Storage as in the boiling test 5 hours room temperature, with the only difference that the storage under standard atmospheric conditions was not for 5 hours, but for 48 hours (=boiling test 48 hours at room temperature).

VII Determination of the Peel Strength

After corresponding storage, the bonds were cut into 2 cm wide test strips. The test strips were clamped into a tensile testing machine (materials testing machine 1445 made by Zwick), and the bonds were separated by peeling under an angle of 180° at a speed of 300 mm/minute. The peel strength is the force in N/cm, which has to be applied for this purpose.

Determination of the Peel Strength After Temperature Action (Tempering)

The bonds were tempered for 30 minutes at 70° C., then stored for 7 hours under standard atmospheric conditions, and subsequently the peel strength was determined (=tempering—standard atmospheric conditions). In a further test, the bonds were tempered for 30 minutes at 70° C., then stored for 5 hours under standard atmospheric conditions, and subsequently stored for 30 minutes in boiling water and finally for 1 hour in cold water (23° C.), before the peel strength was determined (=tempering—boiling test).

In Table 1, the measured values for the peel strength after storage of the test specimens under standard atmospheric conditions and for tempering—standard atmospheric conditions are listed.

In Table 2, the measured values for the peel strength of the test specimens after storage in water and for the tempering—boiling test are listed.

TABLE 1

| | Peel strength in N/cm after storage under standard atmospheric conditions | | | | | | |
|---|---|---|---|---|---|---|---|
| | Storage time | | | | | | |
| Test | 5 min | 15 min | 30 min | 1 h | 5 h | 48 h | Tempering |
| Example 7 | 1.62 | 1.20 | 1.87 | 1.35 | 1.30 | 2.50 | 3.10 |
| Example 8 | 1.10 | 1.40 | 1.10 | 1.30 | 1.70 | 2.67 | 2.19 |
| Example 9 | 1.39 | 1.25 | 1.10 | 1.30 | 1.43 | 1.80 | 2.07 |
| Comparison Ex. 1 | 1.50 | 1.80 | 1.90 | 2.17 | 1.70 | 2.76 | 2.48 |
| Comparison Ex. 2 | 0.86 | 0.60 | 0.62 | 0.60 | 0.60 | 0.63 | 0.81 |

TABLE 2

| | Peel strength in N/cm after storage in water | | |
|---|---|---|---|
| | Storage | | |
| Test | Boiling test 5 hours at room temperature | Boiling test 48 hours at room temperature | Tempering - boiling test |
| Example 7 | 1.29 | 1.40 | 1.28 |
| Example 8 | 1.62 | 1.56 | 1.53 |
| Example 9 | 1.56 | 1.68 | 1.90 |
| Comparison Ex. 1 | 1.23 | 1.71 | 1.71 |
| Comparison Ex. 2 | 0.00 | 0.00 | 0.00 |

What is claimed is:

1. An aqueous dispersion of copolymers containing carbonyl groups, and said dispersion also containing aminooxy crosslinking agents, said dispersion comprising:
  a) from about 30 to about 70% by weight, relative to the total weight of the dispersion, of a copolymer comprising from about 70 to about 99.9% by weight of at least one comonomer selected from the group consisting of (meth) acrylates of alcohols having 1 to 10 carbon atoms, residues of vinyl esters of saturated aliphatic carboxylic acids having 2 to 10 carbon atoms, olefins, vinyl aromatic, vinyl halide, and vinyl ethers, and from about 0.1 to about 30% by weight of at least one ethylenically unsaturated comonomer containing carbonyl groups selected from the group consisting of ethylenically $\alpha,\beta$-unsaturated aldehydes, alkyl vinyl ketones, vinyl ketocarboxylates, N-keto-acrylamides, diketene, carbon monoxide and acetoacetoxyethyl (meth) acrylate; and
  b) from about 0.1 to about 10 mol, per mol of carbonyl groups in said copolymer of an aminooxy crosslinking agent of the formula

$$(H_2NO)_mR(CONHNH_2)_n$$

where R is substituted or unsubstituted aliphatic or aromatic hydrocarbon radical or an organosiloxane radical, $m \geq 1$ and $n=0$ or 1, and $m+n \leq 3$, or a salt thereof with an anion of an organic or inorganic acid.

2. An aqueous dispersion as claimed in claim 1, wherein the content of ethylenically unsaturated comonomer containing carbonyl groups in the copolymer is from about 0.1 to 20% by weight relative to the copolymer.

3. An aqueous dispersion as claimed in claim 1, wherein the content of ethylenically unsaturated comonomer containing carbonyl groups in the copolymer is from about 0.5 to about 5% by weight, relative to the copolymer.

4. An aqueous dispersion as claimed in claim 1, wherein the copolymer contains up to 10% by weight, relative to the copolymer, of ethylenically unsaturated functional comonomer.

5. An aqueous dispersion as claimed in claim 1, wherein the ethylenically unsaturated comonomer containing carbonyl groups in the copolymer comprises at least one member selected from the group consisting of acrolein, methacrolein, crotonaldehyde, formylstyrene, vinyl methyl ketone, vinyl ethyl ketone, vinyl levulinate, acetoacetoxyethyl acrylate, acetoacetoxyethyl methacrylate, carbon monoxide and diacetone-acrylamide.

6. An aqueous dispersion as claimed in claim 5, said copolymer containing at least one member selected from the group consisting of diacetone-acrylamide, crotonaldehyde, methacrolein, acetoacetoxyethyl acrylate and acetoacetoxyethyl methacrylate.

7. An aqueous dispersion as claimed in claim 1, wherein said copolymer selected from the group consisting of copolymer based on ethylene/vinyl chloride monomer having an ethylene content of from about 10 to about 50% by weight and a vinyl chloride content of from about 50 to about 90% by weight, ethylene/vinyl ester monomer, having an ethylene content of from about 10 to about 50% by weight and a vinyl ester content of from about 50 to 90% by weight, ethylene vinyl ester/(meth)acrylate monomer having an ethylene content of from about 10 to 50% by weight, a vinyl ester content of from about 50 to 90% by weight and a (meth)acrylate content of from about 5 to about 20% by weight, copolymers based on said ethylene/vinyl chloride, ethylene/vinyl acetate and ethylene/vinyl acetate/(meth) acrylate residues having a content of up to about 10% by weight of at least one monomer selected from the group consisting of N-methylolacrylamide, acrylic acid, vinylsulfonate and/or 2-hydroxypropyl acrylate and copolymers containing (meth)acrylates containing at least one monomer selected from the group consisting of methyl methacrylate, butyl acrylate and ethylhexyl acrylate, the % by weight data relating to the total weight of monomer of said copolymer and always adding up to 100% by weight of the monomer residue (1).

8. An aqueous dispersion as claimed in claim 1, which contains from about 0.3 to about 4 mol, agent.

9. An aqueous dispersion as claimed in claim 1, wherein the crosslinking agent consists essentially of difunctional compounds of the formula $(H_2NO)_mR(CONHNH_2)_n$ wherein $m \geq 1$, $n = 0$ or 1.

10. An aqueous dispersion as claimed in claim 9, wherein the crosslinking agent comprises a compound of the formula $(H_2NO)R(CONHNH_2)$ having one aminooxy group and one hydrazide group.

11. An aqueous dispersion as claimed in claim 9, wherein the crosslinking agent comprises a compound having two aminooxy groups of the formula $(H_2NO)_2R$.

12. An aqueous dispersion as claimed in claim 9, wherein the crosslinking agent comprises at least one compound selected from the groups consisting of diaminooxy-ethane, 1,2-diaminooxy-propane, 1,3-diaminooxy-propane, 1,2-diaminooxy-butane, 1,3-diaminooxy-butane, 1,4-diaminooxy-butane, 2,3-diaminooxy-butane, 1,2-diaminooxy-isobutane, 1,3-diaminooxy-isobutane, disubstituted aminooxy-pentanes and aminooxy-isopentanes, 1,6-diaminooxy-hexane, 1,4-diaminooxy-butane, aminooxy-acetohydrazide, 2-aminooxy-propionohydrazide, 3-aminooxy-propionohydrazide, 2-methyl-2-aminooxy-propionohydrazide, 2-aminooxy-butyrohydrazide, 4-aminooxy-butyrohydrazide, 2-aminooxy-valerohydrazide, 5-aminooxy-valerohydrazide, 2-aminooxy-caprinohydrazide, 2-aminooxy-laurohydrazide, 2-aminooxy-myristohydrazide, 2-aminooxy-palmitohydrazide and 2-aminooxy-stearohydrazide and salts thereof.

13. An aqueous dispersion as claimed in claim 9, wherein the crosslinking agent is selected from the group consisting of 1,3-diaminooxypropane, 1,4-diaminooxy-butane, aminooxy-acetohydrazide, 2-aminooxy-propionohydrazide, 2-methyl-2-aminooxy-propionohydrazide and salts thereof.

14. An aqueous dispersion as claimed in claim 9, wherein the crosslinking agent consists essentially of at least one member selected from the group consisting of 1,3-diaminooxy-propane and 1,4-diaminooxy-butane and salts thereof.

* * * * *